(12) United States Patent
Sommers

(10) Patent No.: US 11,765,068 B2
(45) Date of Patent: Sep. 19, 2023

(54) METHODS, SYSTEMS, AND COMPUTER READABLE MEDIA FOR PROGRAMMABLE DATA PLANE PROCESSOR BASED TRAFFIC IMPAIRMENT

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 60 days.

(21) Appl. No.: 17/560,187

(22) Filed: Dec. 22, 2021

(65) Prior Publication Data

US 2023/0198883 A1  Jun. 22, 2023

(51) Int. Cl.
*H04L 43/50* (2022.01)
*H04L 43/0823* (2022.01)
*G06F 9/455* (2018.01)

(52) U.S. Cl.
CPC .......... *H04L 43/50* (2013.01); *G06F 9/45504* (2013.01); *H04L 43/0823* (2013.01)

(58) Field of Classification Search
CPC .. H04L 43/50; H04L 43/0823; G06F 9/45504
USPC ....................................................... 370/252
See application file for complete search history.

(56) References Cited

U.S. PATENT DOCUMENTS

| | | |
|---|---|---|
| 4,792,753 A | 12/1988 | Iwai |
| 5,247,517 A | 9/1993 | Ross et al. |
| 5,343,463 A | 8/1994 | Van Tetering et al. |
| 5,390,314 A | 2/1995 | Swanson |
| 5,477,531 A | 12/1995 | McKee et al. |
| 5,535,338 A | 7/1996 | Krause et al. |
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |

(Continued)

FOREIGN PATENT DOCUMENTS

| | | |
|---|---|---|
| CN | 107104903 A | 8/2017 |
| EP | 0895375 A2 | 2/1999 |

(Continued)

OTHER PUBLICATIONS

Non-Final Office Action for U.S. Appl. No. 17/542,011 (dated Sep. 30, 2022).

(Continued)

*Primary Examiner* — Gbemileke J Onamuti

(57) ABSTRACT

According to one method, the method occurs at a first impairment device comprising at least one programmable data plane processor. The method includes receiving, via an application programming interface (API) and from a test controller, command and control instructions for configuring a packet processing pipeline for facilitating traffic impairments; configuring, using the command and control instructions, the packet processing pipeline implemented using the at least one programmable data plane processor; and applying, via the packet processing pipeline, at least one impairment to one or more test packets for testing a system under test (SUT).

20 Claims, 8 Drawing Sheets

(56) References Cited

U.S. PATENT DOCUMENTS

| | | |
|---|---|---|
| 5,671,351 A | 9/1997 | Wild et al. |
| 5,751,963 A | 5/1998 | Umetsu |
| 5,761,486 A | 6/1998 | Watanabe et al. |
| 5,787,147 A | 7/1998 | Gundersen |
| 5,787,253 A | 7/1998 | McCreery et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 5,991,265 A | 11/1999 | Lincoln |
| 6,011,777 A | 1/2000 | Kunzinger |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,252,891 B1 | 6/2001 | Perches |
| 6,279,124 B1 | 8/2001 | Brouwer et al. |
| 6,295,557 B1 | 9/2001 | Foss et al. |
| 6,314,531 B1 | 11/2001 | Kram |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,414,939 B1 | 7/2002 | Yamato |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,529,475 B1 | 3/2003 | Wan et al. |
| 6,535,487 B1 | 3/2003 | Biswas et al. |
| 6,545,979 B1 | 4/2003 | Poulin |
| 6,549,517 B1 | 4/2003 | Aweya et al. |
| 6,601,020 B1 | 7/2003 | Myers |
| 6,621,805 B1 | 9/2003 | Kondylis et al. |
| 6,678,246 B1 | 1/2004 | Smyth |
| 6,691,167 B2 | 2/2004 | Procopio et al. |
| 6,711,137 B1 | 3/2004 | Klassen et al. |
| 6,717,917 B1 | 4/2004 | Weissberger et al. |
| 6,785,238 B1 | 8/2004 | Kago |
| 6,826,259 B2 | 11/2004 | Hoffman |
| 6,845,352 B1 | 1/2005 | Wang |
| 6,917,595 B2 | 7/2005 | Chang et al. |
| 7,039,712 B2 | 5/2006 | Valavi et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,222,255 B1 | 5/2007 | Claessens et al. |
| 7,304,951 B2 | 12/2007 | Rhee |
| 7,327,686 B2 | 2/2008 | Standridge |
| 7,342,897 B1 | 3/2008 | Nader et al. |
| 7,366,174 B2 | 4/2008 | MacFaden et al. |
| 7,418,492 B1 | 8/2008 | Cohen et al. |
| 7,468,947 B2 | 12/2008 | Mannal et al. |
| 7,486,728 B2 | 2/2009 | Park |
| 7,507,948 B2 | 3/2009 | Park et al. |
| 7,525,473 B2 | 4/2009 | Chu et al. |
| 7,783,463 B2 | 8/2010 | Herro |
| 7,840,664 B2 | 11/2010 | Dugatkin et al. |
| 7,873,056 B2 | 1/2011 | Higuchi et al. |
| 7,908,130 B2 | 3/2011 | Van Ginkel et al. |
| 7,979,225 B2 | 7/2011 | Muller et al. |
| 8,718,070 B2 | 5/2014 | Koponen et al. |
| 8,761,187 B2 | 6/2014 | Barde |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 9,042,245 B2 | 5/2015 | Tzannes et al. |
| 9,049,271 B1 | 6/2015 | Hobbs et al. |
| 9,065,770 B2 | 6/2015 | Chew et al. |
| 9,231,849 B2 | 1/2016 | Hyoudou et al. |
| 9,294,296 B2 | 3/2016 | Kirschnick et al. |
| 9,503,382 B2 | 11/2016 | DeCusatis et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,819,551 B2 | 11/2017 | Forster et al. |
| 9,898,317 B2 | 2/2018 | Nakil et al. |
| 9,912,592 B2 * | 3/2018 | Sampath ............. H04L 69/22 |
| 9,971,620 B2 | 5/2018 | Karnes |
| 10,015,072 B2 | 7/2018 | Cantwell et al. |
| 10,063,473 B2 | 8/2018 | Wenig |
| 10,579,408 B2 | 3/2020 | Wang et al. |
| 10,623,296 B2 | 4/2020 | Haramaty et al. |
| 10,649,747 B2 * | 5/2020 | Voellmy ............... G06F 8/41 |
| 10,686,671 B1 | 6/2020 | Mozumdar et al. |
| 10,733,088 B1 | 8/2020 | Sommers |
| 10,742,533 B2 | 8/2020 | Yadav et al. |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 11,323,354 B1 | 5/2022 | Sommers |
| 11,388,081 B1 | 7/2022 | Sommers et al. |
| 11,405,302 B1 | 8/2022 | Liu et al. |
| 11,483,227 B2 | 10/2022 | Sommers |
| 11,483,228 B2 | 10/2022 | Liu et al. |
| 2001/0016867 A1 | 8/2001 | Hu et al. |
| 2002/0056100 A1 | 5/2002 | Shimomura et al. |
| 2002/0085502 A1 | 7/2002 | Chheda et al. |
| 2002/0105911 A1 | 8/2002 | Pruthi et al. |
| 2002/0138226 A1 | 9/2002 | Doane |
| 2002/0160259 A1 | 10/2002 | Mcneely et al. |
| 2002/0172205 A1 | 11/2002 | Tagore-Brage et al. |
| 2002/0184527 A1 | 12/2002 | Chun et al. |
| 2003/0009544 A1 | 1/2003 | Wach |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0188003 A1 | 10/2003 | Sylvest et al. |
| 2003/0191590 A1 | 10/2003 | Narayan et al. |
| 2003/0231741 A1 | 12/2003 | Rancu et al. |
| 2004/0111502 A1 | 6/2004 | Oates |
| 2004/0111519 A1 | 6/2004 | Fu et al. |
| 2004/0117474 A1 | 6/2004 | Ginkel et al. |
| 2004/0190449 A1 | 9/2004 | Mannal et al. |
| 2004/0190606 A1 | 9/2004 | Deshpande |
| 2004/0236866 A1 | 11/2004 | Dugatkin et al. |
| 2005/0021715 A1 | 1/2005 | Dugatkin et al. |
| 2006/0002305 A1 | 1/2006 | Ginzburg |
| 2007/0133441 A1 | 6/2007 | Kang et al. |
| 2007/0165531 A1 | 7/2007 | Labrador et al. |
| 2008/0186968 A1 | 8/2008 | Farinacci et al. |
| 2009/0168720 A1 | 7/2009 | Vinayakray-Jani et al. |
| 2010/0008305 A1 | 1/2010 | Yeo et al. |
| 2010/0153055 A1 | 6/2010 | Mucha et al. |
| 2010/0299433 A1 | 11/2010 | De Boer et al. |
| 2012/0120801 A1 | 5/2012 | Ramakrishnan et al. |
| 2013/0013107 A1 | 1/2013 | Felique |
| 2013/0063441 A1 | 3/2013 | Choy et al. |
| 2014/0006570 A1 | 1/2014 | Loos et al. |
| 2014/0047125 A1 | 2/2014 | Hyoudou et al. |
| 2014/0160961 A1 | 6/2014 | Dragulescu et al. |
| 2014/0298335 A1 | 10/2014 | Regev et al. |
| 2014/0321285 A1 | 10/2014 | Chew et al. |
| 2015/0317169 A1 | 11/2015 | Sinha et al. |
| 2015/0334030 A1 | 11/2015 | Vasseur et al. |
| 2015/0365288 A1 | 12/2015 | Van Der et al. |
| 2017/0126588 A1 | 5/2017 | Anand et al. |
| 2017/0353531 A1 | 12/2017 | Conn |

(56) References Cited

U.S. PATENT DOCUMENTS

| | | |
|---|---|---|
| 2018/0101631 A1 | 4/2018 | Havard |
| 2019/0222481 A1 | 7/2019 | Hira |
| 2019/0372881 A1 | 12/2019 | Hu et al. |
| 2020/0021512 A1 | 1/2020 | Naskar et al. |
| 2020/0028772 A1 | 1/2020 | Laslau |
| 2020/0112524 A1 | 4/2020 | Sindhu et al. |
| 2020/0133688 A1 | 4/2020 | Shinde et al. |
| 2020/0195519 A1 | 6/2020 | Di Martino |
| 2020/0280518 A1 | 9/2020 | Lee et al. |
| 2020/0296023 A1 | 9/2020 | Kumar et al. |
| 2020/0313999 A1 | 10/2020 | Lee et al. |
| 2020/0366588 A1 | 11/2020 | Bergeron |
| 2021/0328902 A1 | 10/2021 | Huselton et al. |
| 2022/0116303 A1 | 4/2022 | Sommers et al. |
| 2022/0116304 A1 | 4/2022 | Sommers et al. |
| 2022/0247661 A1 | 8/2022 | Liu et al. |
| 2022/0253324 A1 | 8/2022 | Liu et al. |
| 2023/0115762 A1 | 4/2023 | Ameling et al. |
| 2023/0179506 A1 | 6/2023 | Bergeron et al. |

FOREIGN PATENT DOCUMENTS

| | | |
|---|---|---|
| JP | 2000049863 | 2/2000 |
| JP | 2000278265 | 10/2000 |
| JP | 4620103 B2 | 1/2011 |
| WO | 02056541 A2 | 7/2003 |
| WO | 2021015802 A1 | 1/2021 |

OTHER PUBLICATIONS

Notice of Allowance and Fee(s) Due for U.S. Appl. No. 17/069,768 (dated Aug. 4, 2022).
Notice of Allowance and Fee(s) Due for U.S. Appl. No. 17/162,620 (dated Jul. 13, 2022).
Notice of Allowance and Fee(s) Due for U.S. Appl. No. 17/162,620, filed Jun. 23, 2022).
Notice of Allowance and Fee(s) Due for U.S. Appl. No. 17/198,870 (dated Mar. 24, 2022).
Non-Final Office Action for U.S. Appl. No. 17/069,768 (dated Jan. 27, 2022).
Notice of Allowance and Fee(s) Due for U.S. Appl. No. 17/067,627 (dated Feb. 8, 2022).
Notice of Allowance and Fee(s) Due for U.S. Appl. No. 17/217,920 (dated Jan. 14, 2022).
"INE Network Emulator Appliance," Technical Specifications, pp. 1-2 (2018).
Notice of Allowance and Fee(s) Due for U.S. Appl. No. 17/217,920 (dated Mar. 4, 2022).
"TekExpress USB 3.0 (USB-RMT) Automated Receiver Compliance and Margin Test Solutions," Tektronix, pp. 1-154 (2021).
"QSFP DD Loopback Modules," High Speed IO, Amphenol ICC, pp. 1-2 (2021).
Sultana et al., "Flightplan Dataplane Disaggregation and Placement for P4 Programs," 18th {USENIX} Symposium on Networked Systems Design and Implementation, pp. 1-22 (2021).
Commonly-Assigned, co-pending U.S. Appl. No. 17/542,011 for "Methods, Systems, and Computer Readable Media for Providing Adaptive Background Test Traffic in a Test Environment," (Unpublished, filed Dec. 3, 2021).
Notice of Allowance and Fee(s) Due for U.S. Appl. No. 17/067,627 (dated Oct. 22, 2021).
Commonly-Assigned, co-pending U.S. Appl. No. 17/498,723 for "Methods, Systems, and Computer Readable Media for Recycling Background Traffic in a Test Environment," (Unpublished, filed Oct. 11, 2021).
Advisory Action for U.S. Appl. No. 17/069,768 (dated Sep. 28, 2021).
Non-Final Office Action for U.S. Appl. No. 17/198,870 (dated Sep. 17, 2021).
Notice of Allowance and Fee(s) Due for U.S. Appl. No. 17/067,627 (dated Aug. 20, 2021).
Final Office Action for U.S. Appl. No. 17/069,768 (dated Jul. 9, 2021).
Non-Final Office Action for U.S. Appl. No. 17/069,768 (dated Feb. 4, 2021).
"Network Emulator II—Ethernet 10GE, 1GE, and 100MbE Ethernet Impairment Emulation," Keysight Technologies, pp. 1-8 (Oct. 22, 2020).
Commonly-Assigned, co-pending U.S. Appl. No. 17/067,627 for "Methods, Systems, and Computer Readable Media for Network Testing Using Switch Emulation," (Unpublished, filed Oct. 9, 2020).
Commonly-Assigned, co-pending U.S. Appl. No. 17/069,768 for "Methods, Systems and Computer Readable Media for Active Queue Management," (Unpublished, filed Oct. 13, 2020).
Stevens, "TCP/IP Illustrated, vol. 1: The Protocols," pp. 1-3 (1994).
Nichols, "Improving Network Simulation with Feedback," IEEE, 14 pages (1998).
Li et al., "A Simulation Study of TCP Performance in ATM Networks with ABR and UBR Services," IEEE, pp. 1269-1276 (1996).
Non-Final Office Action for U.S. Appl. No. 10/317,312 (dated Jan. 30, 2006).
Kurose et al., "Computer Networking: A Top-Down Approach Featuring the Internet," pp. 167-172 (2001).
"UCB/LBNL/NINT Network Simulator—ns (version 2)," http://web.archive.org/web/20000819030658/http://www.isi.edu/hsnam/ns/, Information Sciences Institute, 4 pages (Aug. 2000).
Leon-Garcia et al., "Communication Networks Fundamentals Concepts and Key Architectures," pp. 57-63 and 575-577 (2000).
Fall et al., "Simulation-based Comparisons of Tahoe, Reno, and Sack TCP," 18 pages (Jan. 7, 1998).
Notice of Allowance and Fee(s) Due for U.S. Appl. No. 10/317,312 (dated Dec. 9, 2010).
Interview Summary for U.S. Appl. No. 10/317,312 (dated Aug. 25, 2010).
Non-Final Office Action for U.S. Appl. No. 10/317,312 (dated May 7, 2010).
Final Office Action for U.S. Appl. No. 10/317,312 (dated Mar. 26, 2009).
Non-Final Office Action for U.S. Appl. No. 10/317,312 (dated Aug. 29, 2008).
Non-Final Office Action for U.S. Appl. No. 10/317,312 (dated Mar. 17, 2008).
Final Office Action for U.S. Appl. No. 10/317,312 (dated Sep. 12, 2007).
"TCP/IP model," http://en.wikipedia.org/wiki/TCP/IP_model, 8 pages (Aug. 2007).
Non-Final Office Action for U.S. Appl. No. 10/317,312 (dated Mar. 22, 2007).
"The Value of Network Impairment Testing in Power Grids," Calnex SNE, pp. 1-2 (2006).
Final Office Action for U.S. Appl. No. 10/317,312 (dated Aug. 11, 2006).
Zhang et al., "HyperV: A High Performance Hypervisor for Virtualization of the Programmable Data Plane," 2017 26th International Conference on Computer Communication and Networks (ICCCN), pp. 1-9 (2017).
Cziva et al., "High-Performance Virtualized SDN Switches for Experimental Network Testbeds," SI:SC16—INDIS, pp. 1-14 (Nov. 8, 2016).
Khalidi, "SONiC: The networking switch software that powers the Microsoft Global Cloud," Blog(/en-us/blog/) Cloud Strategy, pp. 1-10 (Mar. 8, 2017).
Siron, "What is the Hyper-V Virtual Switch and How Does it Work?" Altaro, pp. 1-22 (Sep. 26, 2019).
Han et al., "Virtualization in Programmable Data Plane: A Survey and Open Challenges," IEEE Open Journal of the Communications Society, pp. 1-7 (2020).
"Networking/SAI," Open Compute, pp. 1-6 (Oct. 2020).

(56) References Cited

OTHER PUBLICATIONS

Zhou et al., "HyperTester: High-performance Network Testing Driven by Programmable Switches," In The 15th International Conference on emerging Networking Experiments and Technologies (CoNEXT '19), pp. 1-14 (Dec. 9-12, 2019).
Spirent Communications, "Cloud Computing Testing," pp. 1-10 (Apr. 2010).
Byagowi, A., et al., "Bringing the F16 Network into the Lab," OCP Global Summit, pp. 1-16 (Jan. 29, 2021).
Zhang, C., et al., "MPVisor: A Modular Programmable Data Plane Hypervisor," SOSR, pp. 1-2 (Apr. 3-4, 2017).
Tos et al., "Adaptive RTP Rate Control Method," 2011 35th IEEE Annual Computer Software and Applications Conference Workshops, pp. 1-6 (2011).
Mittal et al., "Dynamic Simulation Control with Queue Visualization," Summer Computer Simulation Conference, pp. 1-7 (Jun. 2005).
"Chimera Network Impairment Emulator," Xena Networks, pp. 1-2 (2021).
"Ethernet Network Emulator," MGA2510 Product Brief, Aukua Systems, pp. 1-2 (2021).
"Agilent E4219A ATM Network Impairment Emulator," Keysight, pp. 1-5 (2021).
"Spirent Network Emulator," Spirent Communications, pp. 1-11 (Apr. 2021).
Cao et al., "TurboNet: Faithfully Emulating Networks with Programmable Switches," IEEE, pp. 1-11 (2020).
"Datasheet—Albedo Net.Storm," Albedo Telecom, pp. 1-2 (Dec. 23, 2015).
"Albedo Net.Storm," NETSTORM.en, pp. 1-4 (2014).
Corrected Notice of Allowability for U.S. Appl. No. 17/542,011 (dated Apr. 4, 2023).
Notice of Allowance and Fee(s) Due for U.S. Appl. No. 17/542,011 (dated Mar. 27, 2023).

\* cited by examiner

METHODS, SYSTEMS, AND COMPUTER READABLE MEDIA FOR PROGRAMMABLE DATA PLANE PROCESSOR BASED TRAFFIC IMPAIRMENT

TECHNICAL FIELD

The subject matter described herein relates to network testing. More specifically, the subject matter relates to methods, systems, and computer readable media for programmable data plane processor based traffic impairment.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical CPU-based server or node in the data center. In this example, each VM may execute an operating system and other software, where each VM may appear as a physical server to end users.

It will be appreciated that an emulated or virtualized switch of the type described in this disclosure is distinctly different from the entity referred to commonly in the industry as a virtual switch. More particularly, a virtual switch is a software application that runs on top of central processing unit (CPU), which allows communication between virtual machines, where the virtual machines are administered by a virtual machine hypervisor. A vSwitch does not subdivide and allocate resources of an underlying physical switch ASIC chip into multiple emulated switches, but instead creates a software representation of a completely virtual switch (i.e., there is no mapping to underlying physical switch ASIC hardware).

When testing data center equipment or other network equipment, it is important to make sure that testing mimics real world scenarios and conditions. For example, when testing a data center server or related applications, it may be necessary to mimic or emulate resources in the data center. For example, when testing a data center server or related applications, it may be necessary to mimic or emulate a switching fabric or other resources in the test environment and to emulate or approximate various traffic impairments.

SUMMARY

Methods, systems, and computer readable media for programmable data plane processor based traffic impairment are disclosed. According to one method, the method occurs at a first impairment device comprising at least one programmable data plane processor. The method includes receiving, via an application programming interface (API) and from a test controller, command and control instructions for configuring a packet processing pipeline for facilitating traffic impairments; configuring, using the command and control instructions, the packet processing pipeline implemented using the at least one programmable data plane processor; and applying, via the packet processing pipeline, at least one impairment to one or more test packets for testing a system under test (SUT).

According to one system, the system includes at least one programmable data plane processor and a first impairment device comprising the at least one programmable data plane processor, wherein the first impairment device is configured for: receiving, via an API and from a test controller, command and control instructions for configuring a packet processing pipeline for facilitating traffic impairments; configuring, using the command and control instructions, the packet processing pipeline implemented using the at least one programmable data plane processor; and applying, via the packet processing pipeline, at least one impairment to one or more test packets for testing a SUT.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

Figure 1:
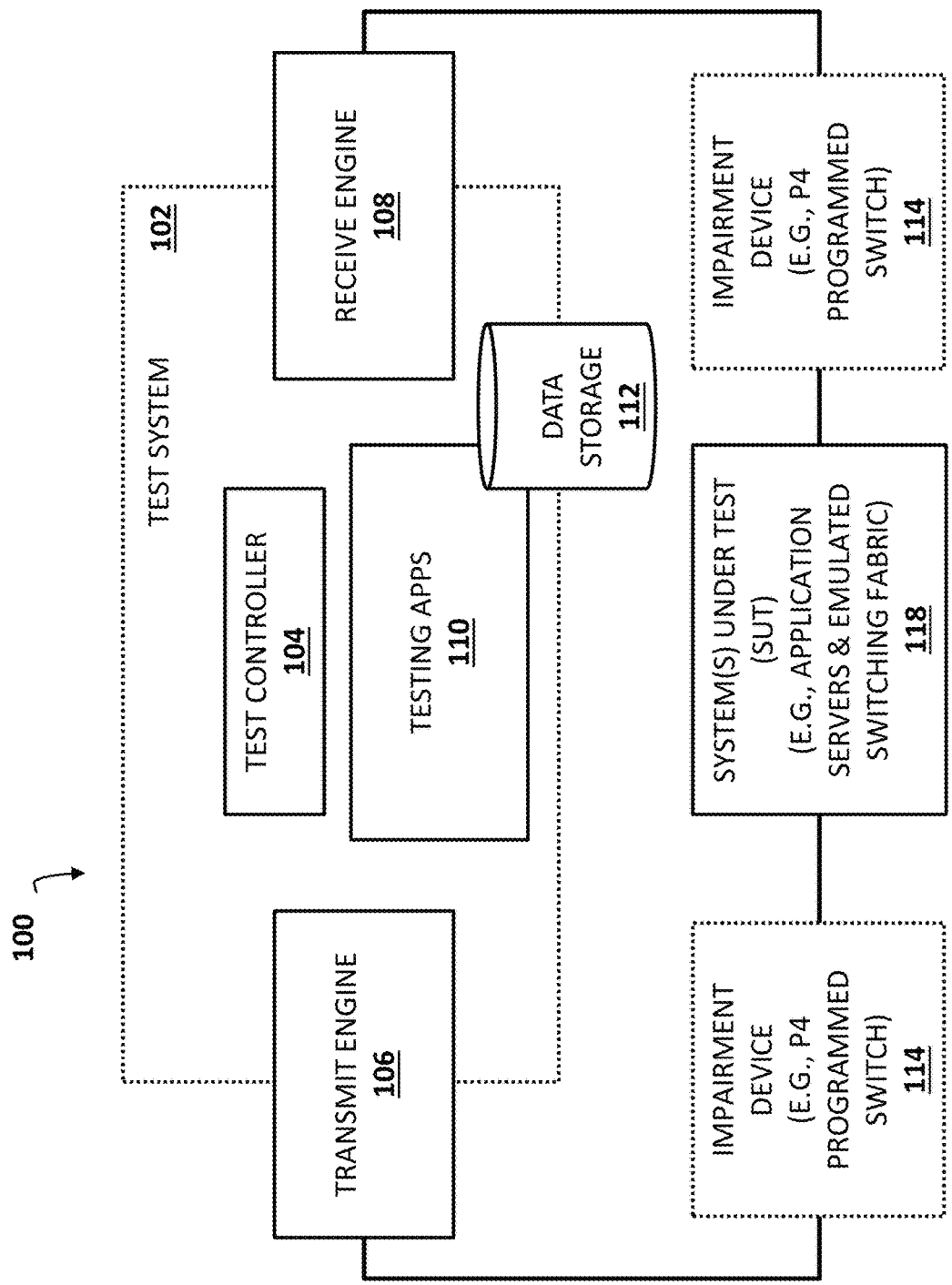
FIG. 1 is a diagram illustrating an example test environment for testing a system under test (SUT)

The subject matter described herein includes methods, systems, and computer readable media for programmable data plane processor based traffic impairment. In accordance with some aspects of the subject matter described herein, a test system (e.g., one or more computing platforms, devices, or nodes) may be configured to program, configure, and/or use a network packet switch that includes one or more programmable data plane processor(s) (e.g., P4 Tofino processor, a network programming language (NPL) programmable processor, etc.), which is controlled or programmed by the test system or a related test controller element. For example, one or more programmable data plane processor(s) may be dynamically programmed or configured to apply a variety of impairments to packets or flows as they transit the impairment device, including an impairment that causes one or more packets of a flow or packets associated with a particular port to be dropped. In some embodiments, packets associated with a flow or a port may be dropped based on random packet selection or a drop algorithm implemented in a packet processing pipeline associated with the programmable data plane processor(s).

In accordance with some aspects of the subject matter described herein, a test system may be configured to perform testing using an emulated and/or live (non-emulated) switching fabric. For example, an example test system described herein may include physical ASIC switching resources for emulating a data center switching fabric comprising virtualized data center switching fabric elements and may be configured to utilize a programmable data plane processor-based impairment device for impairing one or more test packets (e.g., to or from a SUT) during a test session. In another example, an example test system described herein may test a SUT that includes a live switching fabric. In this example, e.g., as part of testing setup, a programmable data plane processor-based impairment device may be inserted in or near the live switching fabric and one or more monitoring agents (e.g., network probes, taps, or analyzer modules) may be added to the live switching fabric for collecting performance metrics.

In accordance with some aspects of the subject matter described herein, testing using a programmable data plane processor-based impairment device may be performed, where impairments are applied and adjusted during testing based on feedback (e.g., observed performance metrics) and target information (e.g., predefined or user-specified target values or ranges for one or more performance metrics). For example, an example test system described herein may be configured to dynamically adjust impairments during a test session based on observable performance metrics (e.g., bit error rate (BER)) and a target range for the performance metrics. In this example, the testing system may perform impairment adjustments using a closed loop-type feedback control mechanism or another feedback based mechanism.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example test environment 100 for testing a SUT 118. Test environment 100 may include one or more networks and/or one or more computer platforms, nodes, or devices. Referring to FIG. 1, test environment 100 may include a test system 102, one or more impairment device(s) 114, and/or SUT 118.

Test system 102 may represent any suitable entity or entities (e.g., one or more computing platforms, nodes, or devices) associated with testing SUT 118 (e.g., one or more application servers, a network controller, or a NMS). For example, test system 102 or a related entity (e.g., a transmit engine 106 or receive engine 108) may generate and send traffic to SUT 118 and/or receive traffic from SUT 118 and may analyze one or more performance aspects associated with SUT 118.

In some embodiments, test system 102 may include a test controller (TC) 104, a transmit engine 106, a receive engine 108, testing apps 110, a data storage 112. TC 104 may be any suitable entity or entities (e.g., software executing on a processor, a field-programmable gateway array (FPGA), and/or an ASIC, or a combination of software, an FPGA, and/or an ASIC) for performing one or more aspects associated with testing SUT 118 and/or various aspects thereof. In some embodiments, TC 104 may be implemented using one or more processors and/or memory. For example, TC 104 may utilize one or more processors (e.g., executing software stored in memory) to generate traffic patterns or scenarios for various message streams (e.g., flows or sessions). In another example, TC 104 may also utilize one or more processors to perform or initiate various tests and/or analyses involving test packets and/or related responses from SUT 118. In this example, TC 104 may send instructions to various modules or entities, e.g., testing applications 110, in test system 102 for controlling (e.g., to pause, (re)start, or stop) a test session.

In some embodiments, TC 104 may utilize various (e.g., out-of-band and/or in-band) ports and/or interfaces for communicating with entities of test system 102. For example, in embodiments where TC 104 is external to TE 106 RE 108, and/or impairment device(s) 114, TC 104 may communicate with these entities via a management port or a related interface. For example, TC 104, testing applications 110, TE 106, RE 108, impairment device(s) 114, and/or other test system entities may communicate via a test system API or a related server. In such embodiments, TC 104 may use the test system API or the related server to send command and control instructions (e.g., configuration information, P4 and/or NPL programming logic, impairment rules, etc.) to various test related entities.

In some embodiments, TC 104 may interact with one or more testing applications 110. Testing applications 110 may represent software for configuring test system 102 or portions thereof. In some embodiments, testing applications 110 can include, but are not limited to, visibility applications, SDN controller applications, GUI and CLI applications, and test traffic generation applications for communicating with SUT 118 and/or an emulated switching fabric environment implemented using an emulation device or platform.

In some embodiments, testing applications 110 may include or utilize one or more user interfaces for receiving settings and/or configuration information for setting up a testing scenario or a related test session. For example, a user interface may include any interface usable by one or more types of user (e.g., a human or another entity like an application, a machine, or a device) to interact with test system 102 or related entities. In some embodiments, one or more user interfaces may support automation e.g., via one or more programming languages (e.g., python), a representation state transfer (REST) API, a remote procedure call API (e.g., gRPC API), a command line interface (CLI), a machine-to-machine (M2M) automation interface, and/or a web based GUI. For example, a test operator may use a web browser to interact with a web based GUI associated with TC 104 and/or testing applications 110 for programming or configuring one or more aspects for testing SUT 118. In another example, a network controller may utilize a M2M automation interface for programming or configuring one or more aspects for testing SUT 118.

In some embodiments, testing applications 110 may include or utilize a GUI or other user interface for selecting and/or configuring test environments, test sessions, and/or other related settings (e.g., test reporting and/or network visibility settings). For example, testing applications 110 may include a web based GUI for obtaining a test operator or another entity's intent for setting up or configuring testing scenarios and/or related test environments (e.g., an emulated data center switching fabric). In this example, the GUI can be used to visually describe a topology comprising one or more emulated switches and/or to indicate particular physical resources to allocate to each emulated switch. In another example, the GUI can be used to gather test session settings and/or other information.

In some embodiments, testing applications 110 may include or utilize a traffic generator. For example, a traffic generator may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. In this example, the traffic generator may be configured to utilize user input and predefined test session templates or related data to generate one or more test cases and/or test sessions.

In some embodiments, testing applications 110 may include or utilize a reporting module and may be configurable by TC 104. For example, a reporting module may be any suitable entity or entities (e.g., software executing on a processor, an ASIC, an FPGA, or a combination of software, an ASIC, or an FPGA) for reporting various information about testing using network visibility functions and/or components (e.g., using virtual or physical probes or network taps). In this example, virtual taps or software may be configured to generate and/or provide switch metrics or other information (e.g., network telemetry, switch and/or link status information, etc.) associated with one or more virtualized switching fabric elements (e.g., emulated switches) of an emulated switching fabric environment. Continuing with this example, the reporting module may generate performance reports or test analysis reports associated with SUT 118, e.g., by utilizing generated metrics or other information associated with packets that pass through or are generated by SUT 118.

Transmit engine (TE) 106 may represent any suitable entity or entities (e.g., devices, systems, or platforms) for receiving, processing, forwarding, and/or sending one or more test packets or other messages associated with testing SUT 118. In some embodiments, TE 106 may include a traffic generator (e.g., a hardware based packet blaster or a software based packet blaster) for generating various test packets that are destined for SUT 118 or for traversing SUT 118 (e.g., to reach RE 108).

Receive engine (RE) 108 may represent any suitable entity or entities (e.g., devices, systems, or platforms) for receiving, processing, forwarding, and/or sending one or more test packets or other messages associated with testing SUT 118. In some embodiments, RE 108 may include a traffic generator (e.g., a hardware based packet blaster or a software based packet blaster) for generating various test packets that are for responding to SUT 118 or for traversing SUT 118 (e.g., to reach TE 106).

In some embodiments, each of TE 106 and RE 108 may include or utilize any suitable entity or entities (e.g., one or more network interface cards (NICs), pluggable jacks, physical processors, transceiver modules, direct-attach cables (DACs) and/or other hardware) for sending or receiving communications. For example, test system 102 may use one or more multiple ports (e.g., physical connection ports) for receiving and sending various types of test packets or related data units; such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

SUT 118 may represent any suitable entity or entities (e.g., devices, systems, or platforms) for being tested by test system 102 or related entities. In some embodiments, SUT 118 may include one or more servers connected via a data center switching fabric or a network. For example, SUT 118 may include a network node, a network switch, a network router, a network interface card, a packet forwarding device, or one or more virtual network functions (VNF) connected via one or more real or emulated network switches. In this example, SUT 118 or a VNF thereof may be software in a virtual container or machine (VC/M) executing on shared resources (e.g., compute, storage, and network resources in a cloud computing environment) and be communicatively coupled to test system 102, impairment device(s) 114, or various other test related entities.

In some embodiments, test system 102 may include a stand-alone tool, a testing device, a network equipment test device or platform, or software executing on one or more processor(s). In some embodiments, test system 102 may be a single device or node or may be distributed across multiple devices or nodes. In some embodiments, test system 102 may include one or more modules for performing various test related functions. For example, test system 102 may include a traffic (e.g., packet) generator for generating test traffic and/or testing related applications (e.g., a test analyzer or test configuration manager) for testing SUT 118.

Impairment device(s) 114 may include or utilize any suitable entity or entities (e.g., software executing on a processor, an ASIC, an FPGA, or a combination of software, an ASIC, or an FPGA) for performing or facilitating traffic impairments. In some embodiments, impairment device(s) 114 may include a programmable data plane processor-based impairment device, such as a network switch or other device comprising one or more P4 and/or NPL programmable data plane processor(s), e.g., a Tofino or Tofino2 processor. In such embodiments, test system 102 and/or TC 104 may send command and control instructions that include P4 and/or NPL programming logic for use by programming data plane processor(s) for implementing one or more packet processing pipelines that facilitate traffic impairments, e.g., packet drops, packet mis-routings, packet latency increases, etc. For example, at run-time, a P4 programmable data plane processor of impairment device(s) 114 may use P4 programming logic to implement or create a data plane packet processing pipeline that can apply one or more impairments to various packets that traverse impairment device(s) 114.

In some embodiments, test system 102 or related entities (e.g., TC 104, testing applications 110, TE 106, RE 108, and/or impairment device(s) 114) may include functionality for accessing data storage 112. Data storage 112 may be any suitable entity or entities (e.g., a storage device, a non-transitory computer readable medium, or a storage system) for maintaining or storing information related to device emulation, fabric emulation, network testing, impairment scenarios, or related test analysis. For example, data storage 112 may include information for impairments to apply during various test sessions and various switching fabric emulation data (e.g., physical to virtual port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 112 may also include test traffic models, test cases, test session data, topology information for emulated switching fabric environments and/or for SUT 118, and/or other information usable for generating performance metrics (e.g., statistics) associated with one or more aspects of SUT 118. In some embodiments, data storage 112 may be located at test system 102, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of TC 104, TE 106, and RE 108, impairment device(s) 114, and testing applications 110. In another, a device or platform may include functionality of TE 106 and impairment device(s) 114.

Figure 2:
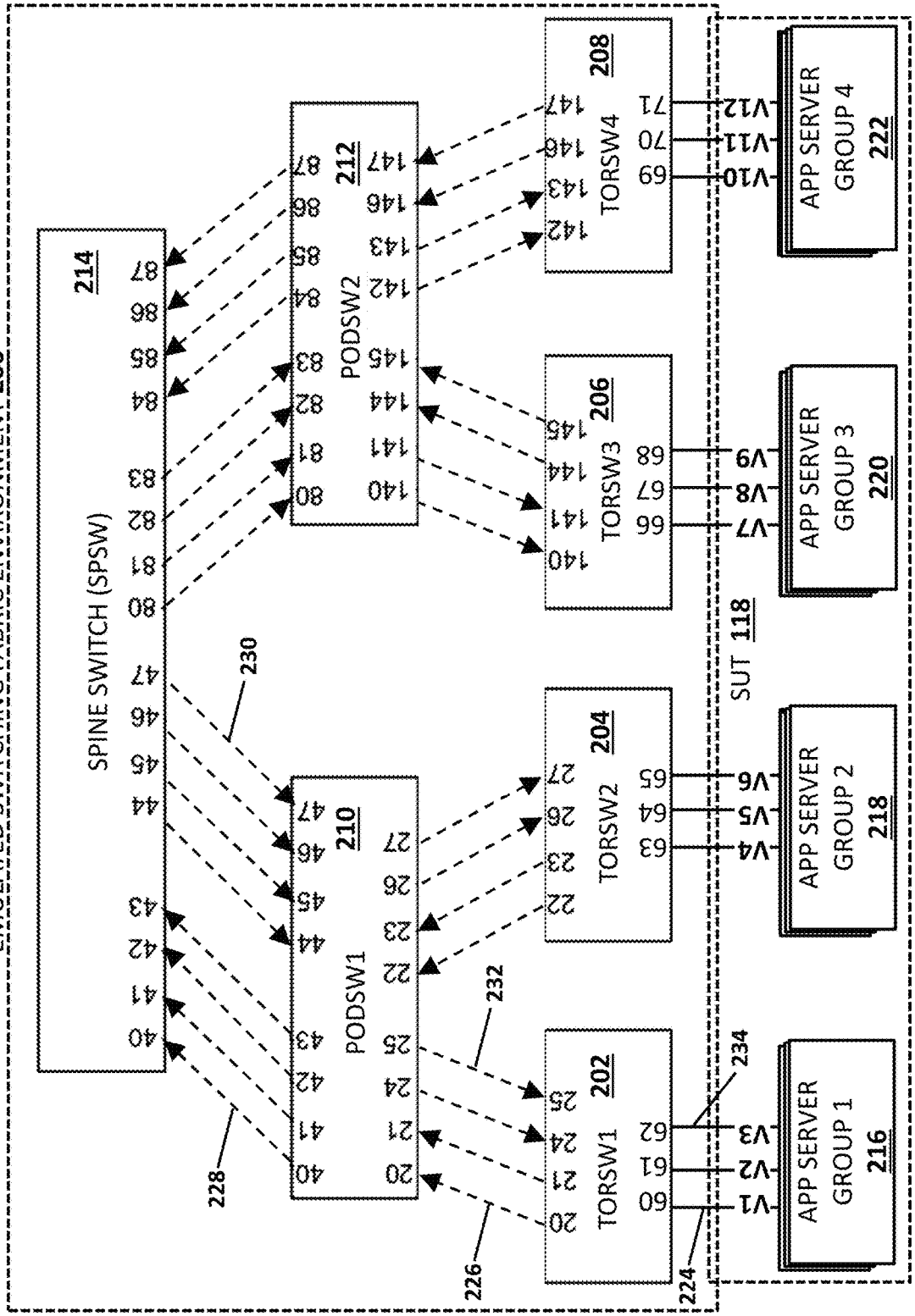
FIG. 2 is a diagram illustrating an example emulated switching fabric environment usable for network testing.

FIG. 2 is a diagram illustrating an example emulated switching fabric environment 200 usable for network testing. Emulated switching fabric environment 200 may represent an emulated data center environment generated by test system 102 or a related entity (e.g., an emulation device controllable by test system 102 or TC 104). In some embodiments, emulated switching fabric environment 200 may include emulated switching fabric elements (e.g., emulated switches) for forwarding packets from or to SUT 118 or other entities. In some embodiments, emulated switching fabric environment 200 may be based on operator input and/or predetermined environment templates or data models, e.g., stored in data storage 112.

In some embodiments, emulated switching fabric environment 200 may be implemented using an emulated data center environment device (EDCED), e.g., a stand-alone device or appliance comprising hardware, software, and firmware) configured to emulate one or more switching fabrics or elements therein.

Referring to FIG. 2, emulated switching fabric environment 200 may represent a 3-stage Clos switching network comprising different stages of emulated switches, e.g., stage one may include top of rack (TOR) switches (TORSWs) 202-208, stage two may include cluster or pod switches (PODSWs) 210-212, and stage three may include a spine switch (SPSW) 214. For example, TORSWs 202-208 may represent or emulate switches that are connected to multiple servers (e.g., located within a rack or nearby rack), PODSWs 210-212 may represent or emulate aggregation switches that are connected to multiple TORSWs, and SPSW 214 may represent or emulate a higher-level aggregation switch that is connected to multiple PODSWs.

As depicted in FIG. 2, for illustrative purposes, various physical and virtual links are numbered including a physical link 224 between app server group 1 216 and TORSW1 202, a virtual link 226 between TORSW1 202 and PODSW1 210, a virtual link 228 between PODSW1 210 and SPSW 214, a virtual link 230 between SPSW 214 and PODSW1 210, a virtual link 232 between PODSW1 210 and TORSW1 202, and a physical link 234 between TORSW1 202 and app server group 1 216.

In some embodiments, some physical ports of an emulation device may be associated with different emulated switches and may utilize loopback interfaces or internal interfaces for emulating communications between some emulated switches, while other emulated switches (e.g., TORSWs 202-208) may utilize physical interfaces and/or physical cabling to communicate with SUT 118 or portions thereof.

In some embodiments, SUT 118 may represent or include a set of application server groups 216-222, each representing one or more servers and/or applications. For example, application server group 1 216 may include multiple servers (e.g., 16 or more servers in a single rack), each having one or more connections to a TOR switch. In some examples, a server of application server groups 216-222 may include multiple applications or perform different services (e.g., machine learning (M/L), storage offload, search engines, webpages, video streaming, email, etc.) for users or may perform similar services for different sets of users. In some examples, a server of application server groups 216-222 may act as a client to another server.

In some embodiments, each of application server groups 216-222 may be connected (e.g., physically cabled) to a different set of physical ports 110 of test system 102, where each set of physical ports 110 is assigned or allocated to a particular emulated switch. For example, RA 106 may assign physical ports '60', '61', and 62' to an emulated switch 'TORSW1' and may virtualize those physical ports as 'v1', 'v2', and 'v3', respectively. In this example, applications and/or servers in application server group 1 216 may be communicatively coupled to one or more of the virtual ports of the emulated switch 'TORSW1'.

It will be appreciated that FIG. 2 is for illustrative purposes and that various depicted entities, their locations, and/or their functions described above in relation to FIG. 2 may be changed, altered, added, or removed.

Figure 3A:
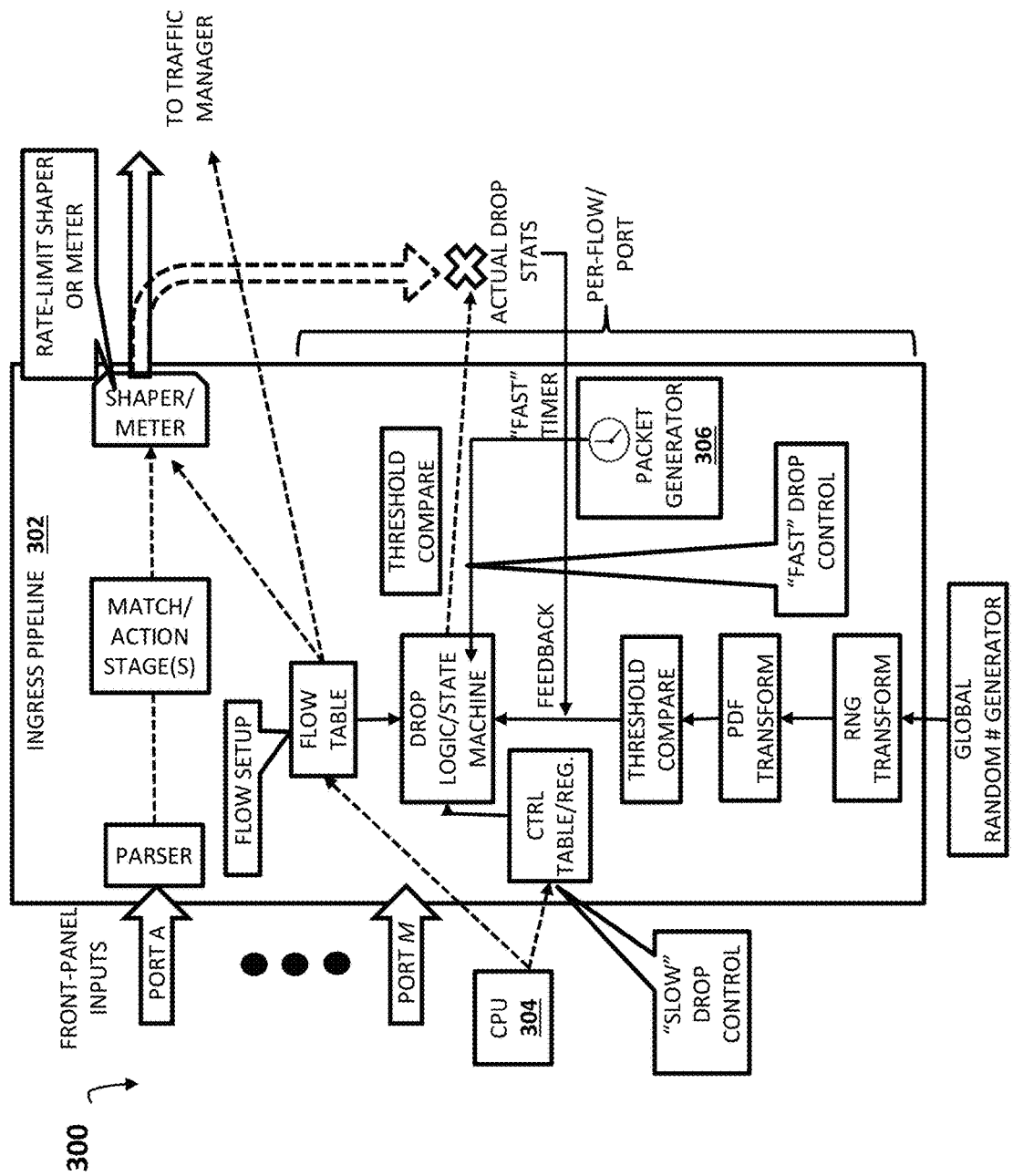
FIGS. 3A-3B are diagrams illustrating various aspects of an example data plane packet processing pipeline.
Figure 3B:
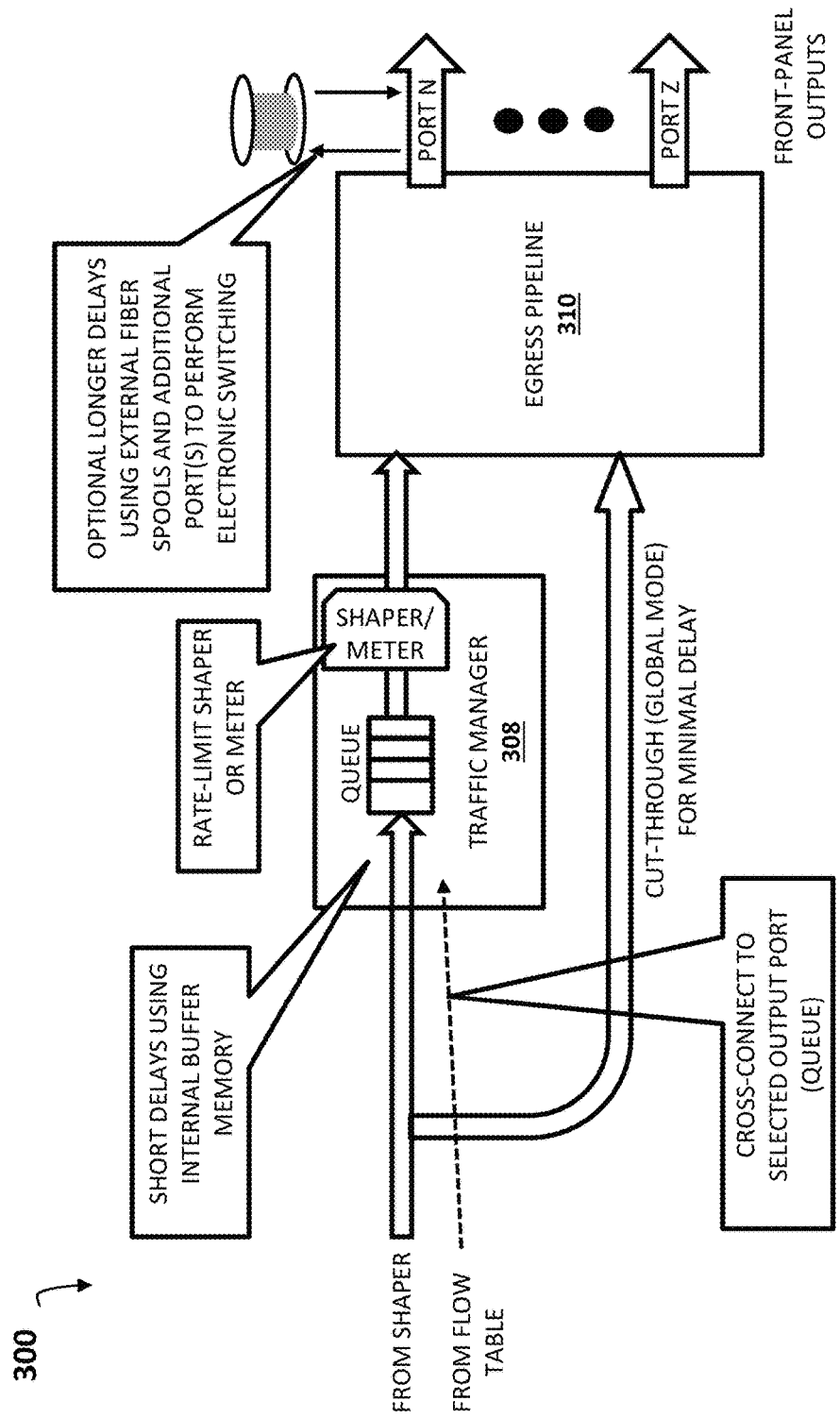

FIGS. 3A-3B are diagrams illustrating various aspects of an example data plane packet processing pipeline (DPPP) 300. DPPP 300 may represent one or more operations that are implemented using a programmable data plane processor (e.g., a Tofino processor, etc.) of impairment device(s) 114. For example, DPPP 300 may be configured using P4 and/or NPL language logic or other programming logic received from test system 102 or TC 104.

In some embodiments, DPPP 300 or related operations may be configured (e.g., by test system 102 or TC 104) to utilize various software and/or hardware (e.g., network interface cards (NICs), random number generator(s) (RNG), CPU 304, data plane tables/registers, built-in packet generator 306 and/or a related timer) located at or in impairment device(s) 114.

In some embodiments, DPPP 300 may apply a variety of impairments to packets or flows as they transit impairment device(s) 114, including an impairment that causes one or more packets of a flow to be dropped. For example, packets associated with a flow may be dropped or impaired based on a random packet selection algorithm or drop algorithm that is implemented in DPPP 300 or related entities (e.g., a built-in timer or probability density functions (PDFs)). In another example, packets associated with a flow may be dropped or impaired based on a flow or port based selection algorithm or drop algorithm that is implemented in DPPP 300 or related entities (e.g., switching tables).

In some embodiments, DPPP 300 may utilize internal "looped-back" ports or external ports of impairment device(s) 114. For example, when processing some packets to add impairments, impairment device(s) 114 may use ports of impairment device(s) 114 that are internally "looped back" (e.g., via appropriate configuration of the programmable data plane). In another example, impairment device(s) 114 may use physical ports that are cross connected to external devices for facilitating a desired impairment.

In some embodiments, DPPP 300 may utilize various external devices and/or related ports to apply delays or other impairments. For example, DPPP 300 may send packets through spools of fiber-optic cable (e.g., connected via one or more ports) to cause optical delay in fixed-size increments. In this example, cross-connections involving spools and impairment device(s) 114 can be used to insert delay into signal paths, even on a per-flow basis using access-control list (ACL) match rules.

Referring to FIG. 3A, DPPP 300 may include an ingress pipeline 302 capable of receiving and processing packets from one or more ports (e.g., front-panel ports) of impairment device(s) 114. In some embodiments, ingress pipeline 302 may apply one or more impairments (which, for example, are configured by TC 104 via an API of impairment device(s) 114) to some or all of received packets.

In some embodiments, DPPP 300 and/or ingress pipeline 302 may implement logic which causes input ports to be mapped to output ports based on flow (e.g., an IP tuple or a flow identifier) or port number (e.g., basic cross-connection forwarding or switching table rules). For example, DPPP 300 and/or ingress pipeline 302 may utilize a flow table to determine whether packets are sent to a traffic shaper and/or meter for rate metering or rate limiting and/or for determining an appropriate egress or output port.

In some embodiments, DPPP 300 and/or ingress pipeline 302 may implement logic for match-action pipeline stages. For example, headers of received packets from one or more ports may be parsed by a parser and, during one or more match-action pipeline stages, DPPP 300 and/or ingress pipeline 302 may apply header manipulations or impairments (e.g., if a header matches a key value of a match-action table entry indicating a particular manipulation or impairment).

In some embodiments, DPPP 300 may implement logic which causes per-flow and/or per-port packet dropping during one or more test sessions. For example, test system 102 or TC 104 may configure DPPP 300 to use one or more random number generators (RNGs) and/or PDFs for varying packet drop percentages associated with various flows or port numbers. For example, a drop percentage selection algorithm or a related drop selection algorithm may be based on numbers generated by an RNG or a uniform PDF thereof. In this example, e.g., to decrease randomness or emulate patterns, additional numbers may be generated using a non-uniform PDF, such as a Poisson probability density function, a geometric probability density function, an exponential probability density function, etc. Continuing with this example, the additional numbers may be used in lieu of or in addition to the numbers generated by the RNG when selecting drop percentages or related thresholds for particular flows or ports or when selecting particular packets to drop or not drop.

In some embodiments, DPPP 300 may implement logic which causes per-port RNG scrambling for de-correlating drop events on ports. For example, DPPP 300 may utilize an RNG to make packet drops on ports more random, e.g., unrelated to particular flows.

In some embodiments, DPPP 300 may implement logic which causes feedback from actual drop counters to be used for fine-adjusting a drop ratio to ensure or facilitate a precise drop percentage. For example, if DPPP 300 is configured to use a random selection algorithm for a particular port to achieve 15% drops, DPPP 300 or a related entity may monitor actual drop counters and tweak a selection algorithm to increase or decrease drops to maintain or achieve the expected drop percentage.

In some embodiments, DPPP 300 may implement logic which causes timer-based drop patterns or packet bursts, e.g., by using one or more event timers (e.g., "fast" timers implemented in built-in packet generator 306) and a state machine or related logic. In such embodiments, DPPP 300 may also implement logic which causes such drop patterns or packet bursts to occur with configurable randomization, e.g., by using varying event timer lengths (e.g., timer lengths may be determined using an RNG).

In some embodiments, e.g., in lieu of or addition to other drop or burst logic, DPPP 300 may implement logic which causes CPU 304 to facilitate drop patterns or packet bursts. For example, DPPP 300 may utilize CPU-based drop commands to facilitate packet drops or packet bursts. In this example, DPPP 300 or a related entity may modify data plane lookup tables or registers to cause arbitrary time-based drop behaviors, e.g., at CPU speeds (which may be slower than using a "fast" timer and a state machine).

Referring to FIG. 3B, DPPP 300 may include an egress pipeline 310 capable of sending packets to one or more ports (e.g., front-panel ports) of impairment device(s) 114. For example, prior to reaching egress pipeline 310, packets may come from a traffic shaper or forwarded based on flow table entries. In some embodiments, egress pipeline 310 may receive impaired packets from a traffic manager 308 (e.g., a software based module or hardware based module) for traffic management or adding delay or other impairments. For example, traffic manager 308 may include one or more queues for adding delay and a traffic shaper/meter for rate metering and/or rate limiting, or other traffic related impairments on per-flow or per-port basis. In some embodiments, packets associated with a cut-through mode or global mode (e.g., packets that are not to be impaired or delayed) may be sent through traffic manager 308 without being queued. In some embodiments, egress pipeline 310 may apply one or more impairments (which, for example, are configured by TC 104 via an API of impairment device(s) 114) to some or all of packets. In some embodiments, rate metering, rate-limiting, and/or traffic shaping may be performed for ingress and/or egress traffic.

In some embodiments, DPPP 300 and/or egress pipeline 302 may implement logic which causes one or more of the packets (e.g., configurable on per-port or per-flow basis) to be switched or forwarded via an external port of impairment device(s) 114 and transmitted towards an external impairment device, which is configured to apply one or more impairments to the packet(s). In such embodiments, packets impaired by the external impairment device may be looped back to DPPP 300 or portions thereof for additional impairments or pass-through to an associated SUT 118 or DUTs therein. In some embodiments, packets may be impaired by impairment device(s) 114 prior to the packets being switched or forwarded to an external impairment device.

In some embodiments, DPPP 300 and/or egress pipeline 302 may implement logic which causes one or more of the packets (e.g., configurable on per-port or per-flow basis) to be switched or forwarded via an external port of impairment device(s) 114 and transmitted towards an external delay line, e.g., spools of fiber optics cable. In such embodiments, packets impaired by the external delay line may be looped back to DPPP 300 or portions thereof for additional delay lines or other impairments or pass-through to an associated SUT 118 or DUTs therein. In some embodiments, packets may be impaired by impairment device(s) 114 prior to the packets being switched or forwarded to external delay line(s).

In some embodiments, DPPP 300 and/or egress pipeline 302 may implement logic which causes one or more of the packets (e.g., configurable on per-port or per-flow basis) to be switched or forwarded to internal delay lines. For example, DPPP 300 or a related entity may utilize a flow table (e.g., match-action table) to indicate which flow or port should utilize internal delay lines.

It will be appreciated that FIGS. 3A-3B are for illustrative purposes and that various depicted entities, their locations, and/or their functions described above in relation to FIGS. 3A-3B may be changed, altered, added, or removed.

Figure 4:
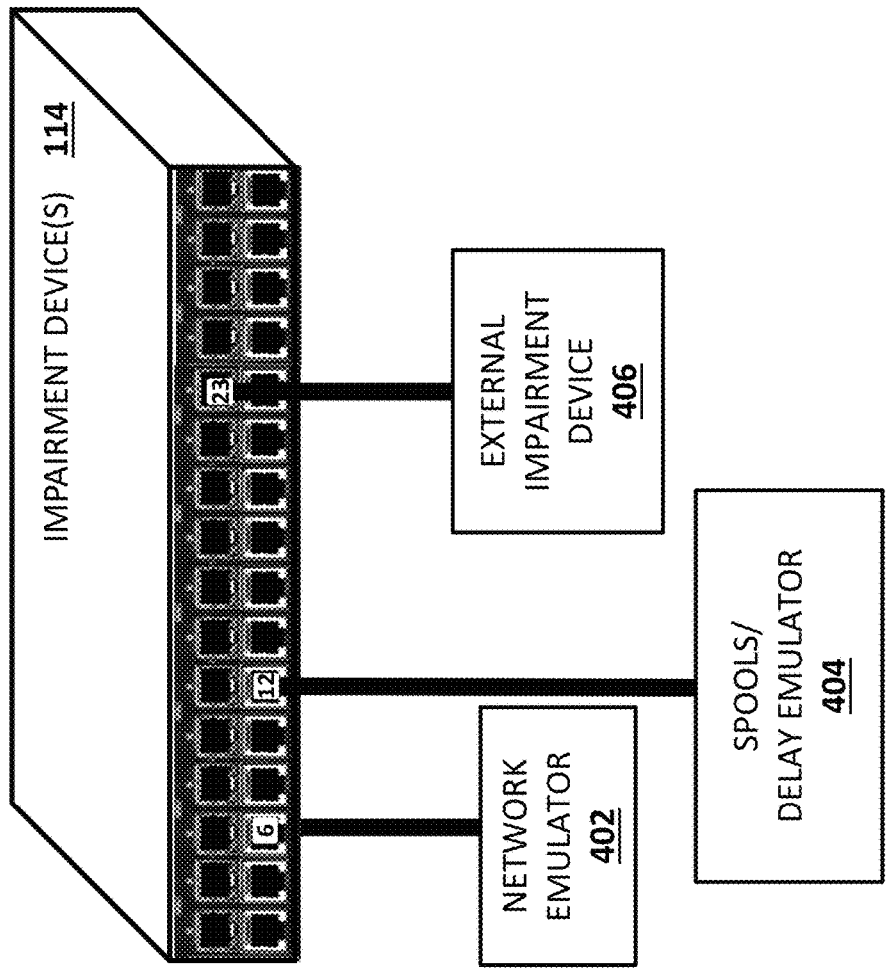
FIG. 4 is a diagram illustrating an example connection scenario involving various elements for providing programmable external delays.

FIG. 4 is a diagram illustrating an example connection scenario 400 involving various elements for providing programmable external delays. Scenario 400 may include impairment device(s) 114 configured for providing programmable external delays, e.g., a network emulator 402, a cable spool and/or delay emulator 404, and/or an external impairment device 406. For example, network emulator 402, delay emulator 404, and/or impairment device 406 may be connected to impairment device(s) 114 via one or more physical ports. In this example, impairment device(s) 114 may send test packets or other traffic to one or more of entities 402-406, e.g., based on a per-flow basis using switching rules or ACL match rules.

In some embodiments, network emulator 402 may represent a device or tool that is designed or capable of applying sophisticated impairments on selected channels, flows, or ports.

In some embodiments, delay emulator 404 may represent, include, or emulate one or more spools of fiber optic cable and may be implemented in rack-mounted equipment. For example, e.g., where delay emulator 404 includes or emulates multiple spools of different lengths, delay emulator 404 may be configured (e.g., by test system 102 or TC 104) to achieve unique delays per "impairment path". In another example, delay emulator 404 may chain delays (e.g., in a binary sequence) for providing a range of delays with fine (e.g., 1 microsecond) increments, e.g. by using 8 different length loops (e.g., a 1 microsecond loop, a 2 microsecond loop, a 4 microsecond loop, an 8 microsecond loop, a 16 microsecond loop, a 32 microsecond loop, a 64 microsecond loop, a 128 microsecond loop, and a 256 microsecond loop) delays between 0-255 microseconds can be applied.

In some embodiments, additional ports of impairment device(s) 114 may be used to allow insertion of impairments of test traffic going to or from SUT 118 and/or test related entities. In such embodiments, impairment device(s) 114 and test related entities may be programmed to route SUT traffic in one or both directions via impairment device 406 or another device.

In some embodiments, entities 402-406 may inject or implement various link-level impairments. Example impairments may include a delay simulating a length of connection medium (e.g., a 90 meters spool of fiber optic cable), an electrical or optical degradation (e.g., using a serdes loopback plug or by changing analog parameters associated with an analog to digital converter), or an impairment for producing bit errors or FEC symbol errors.

It will be appreciated that FIG. 4 is for illustrative purposes and that various depicted entities, their locations, and/or their functions described above in relation to FIG. 4 may be changed, altered, added, or removed.

Figure 5:
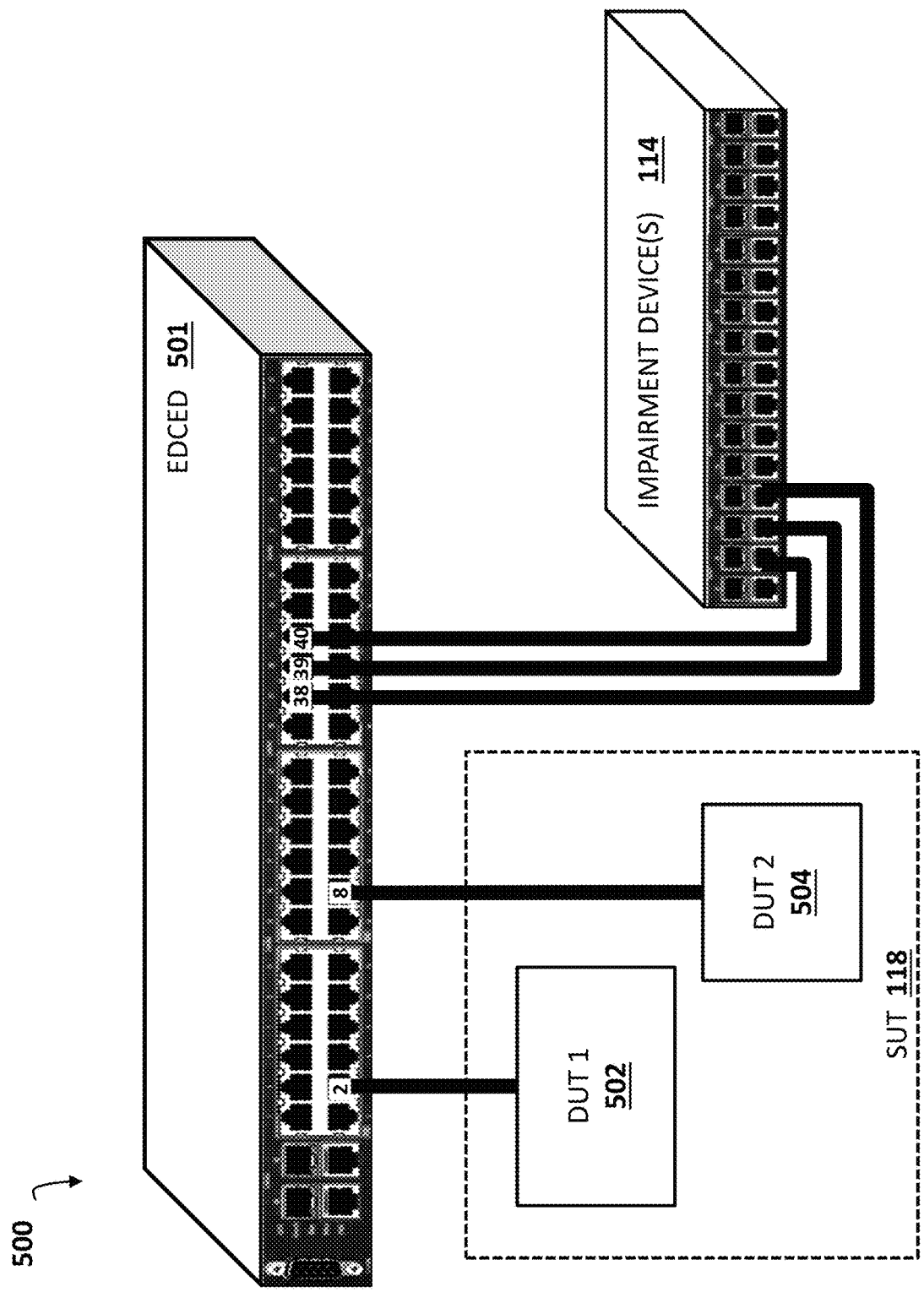
FIG. 5 is a diagram illustrating an example connection scenario involving various elements being connected via an emulation device.

FIG. 5 is a diagram illustrating an example connection scenario 500 involving various elements being connected an example emulated data center environment device (EDCED) 501. EDCED 501 may represent a computing platform (e.g., a stand-alone device or appliance comprising hardware, software, and firmware) configured to emulate one or more switching fabrics or elements therein.

EDCED 501 may also be configured to perform related functions associated with configuring, controlling, and/or interacting with an emulated switching fabric, e.g., emulated switching fabric environment 200. For example, EDCED 501 may be configured to emulate a data center switching fabric (e.g., environment 200) comprising virtualized switching fabric elements implemented using physical ASIC resources. In this example, EDCED 501 may also include modules and/or software for emulating the data center switching fabric, for performing testing associated with the emulated data center switching fabric, and for monitoring traffic or related test performance associated with the emulated data center switching fabric.

In some embodiments, EDCED 501 may include at least some of the functionality described above with regard to test system 102. For example, EDCED 501 may include TC 104, testing apps 110, data storage 112, TE 106, RE 108, and/or physical ports each comprising receive (Rx) and transmit (Tx) logical ports.

In some embodiments, EDCED 501 or a related entity may include various functionality for mapping physical resources of one or more ASIC switches to emulated switches of emulated switching fabric environment 200. In some embodiments, EDCED 501 or a related entity may include logic or software for configuring, implementing, and controlling an emulated switching fabric for testing SUT 118 or DUTs therein, e.g., DUT 502-504.

In some embodiments, EDCED 501 or a related entity may include or interact with one or more sensor(s) and/or a data analyzer. For example, sensor(s) and/or a data analyzer may represent any suitable entity or entities (e.g., software in addition to hardware and/or firmware) for obtaining and/or analyzing performance information, e.g., bit error rate (BER) metrics, delay metrics, etc. In this example, the sensor(s) and/or the data analyzer may include or interact with one or more monitoring agents or visibility modules that are adapted to monitor emulated switching fabric resource performance, e.g., congestion metrics, forward error correction (FEC) symbol error rate, etc.

In some embodiments, EDCED 501 may utilize internal loopbacks (e.g., media access control (MAC) layer or layer 2 loopbacks that are intrinsic to an ASIC device) to simulate a unidirectional, inter-switch link by feeding traffic back into an emulated switching fabric whereupon it is routed to a destination, e.g., an emulated switch. When an internal loopback is in effect, no external device may need to be connected to the physical port connector and the data path from transmit to receive may be entirely internal, e.g., via a MAC or SERDES loopback, each of which exercises different amounts of circuitry but is intended to be transparent.

In some embodiments, EDCED 501 may implement internal loopbacks by treating each port as two independent resource halves, e.g., an ingress port resource (e.g., RX portion) and an egress port resource (e.g., TX portion). For example, software in EDCED 501 may associated a port half resource with a virtual port half. In this example, the software may mitigate conflicts with ASIC hardware, underlying software development kit (SDK) drivers, switch abstraction interface (SAI) wrappers, or NOS software. In some embodiments, VLANs, multicast groups, exclusion groups may be assigned to both ingress and egress ports resources or related port numbers.

In some embodiments, scenario 500 may include test system 102 or various test related entities described above but not shown in FIG. 5. For example, test system 102 and/or TC 104 may be implemented on a device distinct from the various devices depicted but may be connected to impairment device(s) 114, EDCED 501, DUT 502, and/or DUT 504, e.g., via one or more physical or wireless links. In another example, test system 102, TC 104, or other test related entities may be implemented (e.g., as one or more modules) in impairment device(s) 114 and/or EDCED 501.

Referring to FIG. 5, impairment device(s) 114 may be connected to EDCED 501 via one or more physical ports (e.g., using fiber optic cables or other network cables) and DUTs 502-504 (e.g., of SUT 118) may also be connected to EDCED 501 via one or more physical ports. For example, physical port '2' of EDCED 501 may be connected to DUT 502, physical port '8' of EDCED 501 may be connected to DUT 504, and physical ports '38', '39', and '40' of EDCED 501 may be connected to impairment device(s) 114. In this example, impairment device(s) 114 may be configured (e.g., by test system 102 or TC 104) to use internal loopbacks and/or various other pipeline related effects associated with impairment device(s) 114 or other entities to generate or add impairment to traffic from or to DUTs 502-504 or EDCED 501. Continuing with this example, various packets may be impaired prior to or after traversing EDCED 501 or emulated switching fabric environment 200 (being implemented by EDCED 501).

In some embodiments, e.g., where impairment device(s) 114 is cross-connected with EDCED 501, impairment device(s) 114 may be configured (e.g., by test system 102 or TC 104) to forward unidirectional traffic traversing a virtual "fabric" link (e.g., one of links 226-232 in FIG. 2) of emulated switching fabric environment 200 (being implemented by EDCED 501). In such embodiments, impairment device(s) 114 may be configurable to apply impairments to packets traveling in that direction. In some embodiments, assuming that each unidirectional link requires a single port of impairment device(s) 114, a 32-port impairment device(s) 114 could theoretically service 32 unidirectional virtual "fabric" links (e.g., associated with emulated switching fabric environment 200).

In some embodiments, e.g., where impairment device(s) 114 is cross-connected with DUTs 502-504, impairment device(s) 114 may be configured (e.g., by test system 102 or TC 104) to forward unidirectional traffic from or to test hosts (e.g., emulated hosts that generate test packets) involving a port of EDCED 501 so as to allow SUT 118 or DUTs thereof (e.g., DUT 502 or DUT 504) to be tested in a flexible and/or granular manner. For example, referring also to FIG. 5, using a physical port connecting EDCED 501 and DUT 504, unidirectional impairments may be applied to test packets that traverse a physical link (e.g., a cable connected to impairment device(s) 114 via ports 14 or 16) connecting DUT 504 or a host therein and impairment device(s) 114 on their way to or from EDCED 501, e.g., via a physical link (e.g., a cable connected to impairment device(s) 114 via ports 22 or 24) connecting impairment device(s) 114 and EDCED 501.

It will be appreciated that FIG. 5 is for illustrative purposes and that various depicted entities, their locations, and/or their functions described above in relation to FIG. 5 may be changed, altered, added, or removed.

Figure 6:
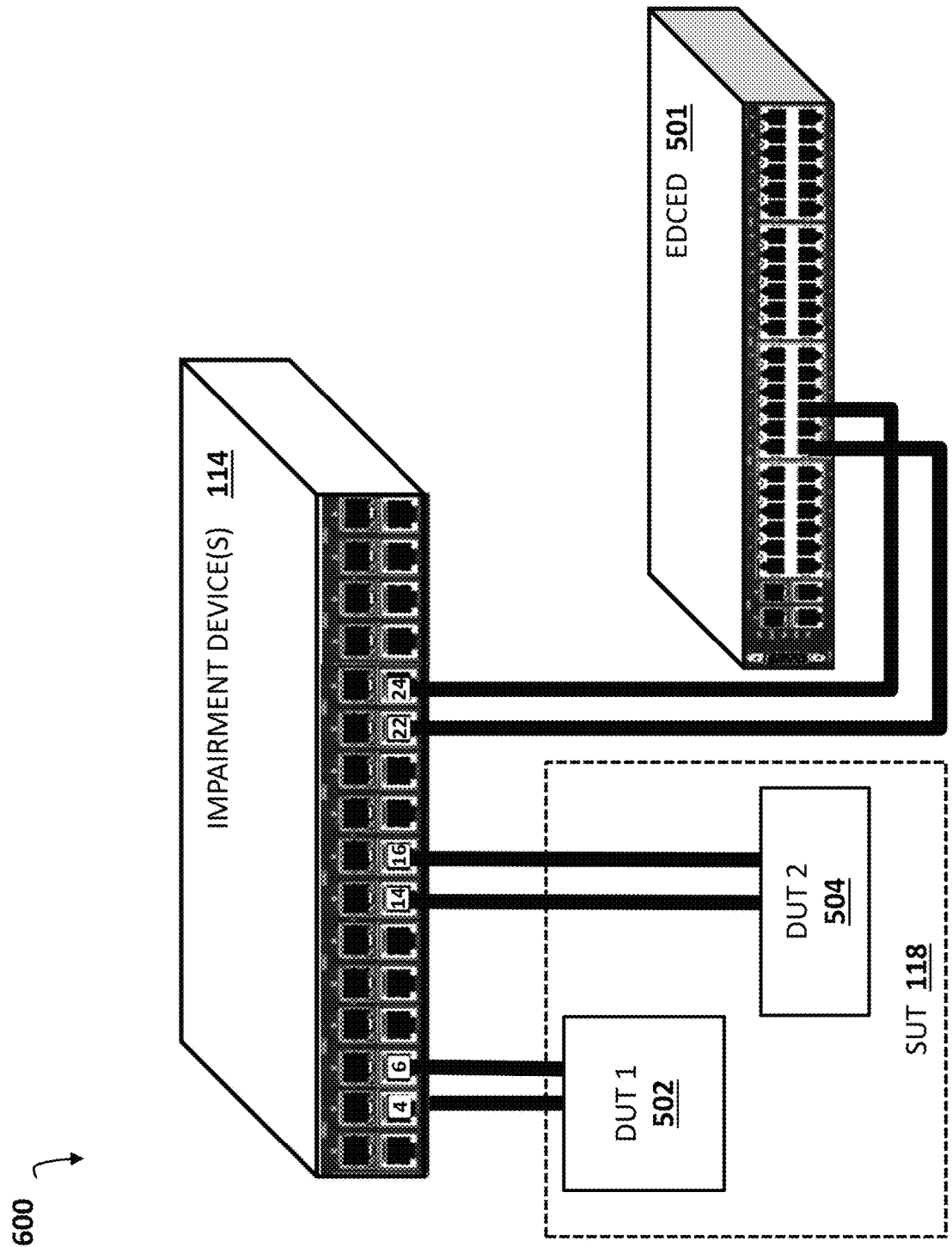
FIG. 6 is a diagram illustrating an example connection scenario involving various elements being connected via an impairment device.

FIG. 6 is a diagram illustrating an example connection scenario 600 involving various elements being connected via one or more impairment device(s) 114. In some embodiments, scenario 600 may include test system 102 or various test related entities described above but not shown in FIG. 6. For example, test system 102 and/or TC 104 may be implemented on a device distinct from the various devices depicted but may be connected to impairment device(s) 114, EDCED 501, DUT 502, and/or DUT 504, e.g., via one or more physical or wireless links. In another example, test system 102, TC 104, or other test related entities may be implemented (e.g., as one or more modules) in impairment device(s) 114 and/or EDCED 501.

Referring to FIG. 6, EDCED 501 may be connected to impairment device(s) 114 via one or more physical ports (e.g., using fiber optic cables or other network cables) and DUTs 502-504 (e.g., of SUT 118) may also be connected to impairment device(s) 114 via one or more physical ports. For example, physical ports '4' and '6' of impairment device(s) 114 may be connected to DUT 502, physical ports '14' and '16' of impairment device(s) 114 may be connected to DUT 504, and physical port '22' and '24' of impairment device(s) 114 may be connected to EDCED 501. In this example, impairment device(s) 114 may be configured (e.g., by test system 102 or TC 104) to use internal loopbacks and/or various other pipeline related effects to generate or add impairment to traffic from or to DUTs 502-504 or EDCED 501. Continuing with this example, various packets may be impaired prior to or after traversing EDCED 501 or emulated switching fabric environment 200 (being implemented by EDCED 501).

In some embodiments, e.g., where impairment device(s) 114 is cross-connected with EDCED 501, impairment device(s) 114 may be configured (e.g., by test system 102 or TC 104) to forward bidirectional traffic traversing two physical ports (e.g., of impairment device(s) 114). In such embodiments, impairment device(s) 114 may be configurable to provide impairments in either or both directions.

In some embodiments, assuming that each bidirectional link (e.g., a host-TORSW link such as link 224 or 234) requires a two ports of impairment device(s) 114, a 32-port impairment device(s) 114 could theoretically service 16 bidirectional links.

It will be appreciated that FIG. 6 is for illustrative purposes and that various depicted entities, their locations, and/or their functions described above in relation to FIG. 6 may be changed, altered, added, or removed.

Figure 7:
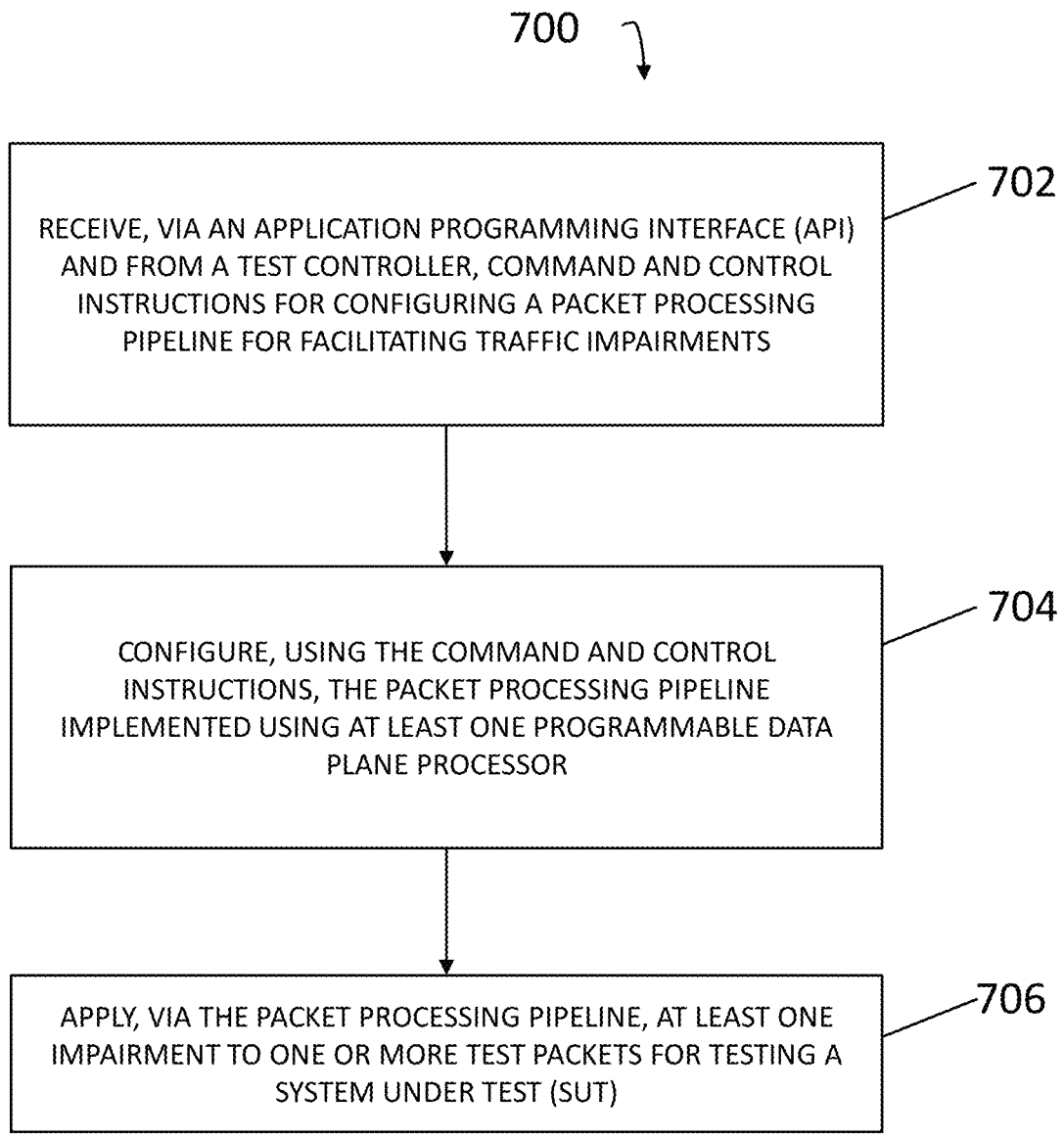
FIG. 7 is a diagram illustrating an example process for programmable data plane processor based traffic impairment.

FIG. 7 is a diagram illustrating an example process 700 for programmable data plane processor based traffic impairment. In some embodiments, process 700, or portions thereof, may be performed by or at test system 102, impairment device(s) 114, EDCED 501, and/or another node or module (e.g., an impairment module). In some embodiments, process 700 may include various operations, e.g., steps 702-706.

Referring to process 700, in step 702, command and control instructions (e.g., data plane processing logic or instructions) for configuring a packet processing pipeline for facilitating traffic impairments may be received via an API (e.g., a test system API or a gRPC API) from a test controller (e.g., TC 104).

In some embodiments, command and control instructions may indicate one or more selection techniques for applying impairments. For example, command and control instructions may include logic for a programmable data plane processor (e.g., a Tofino processor) to perform a per-flow selection technique (e.g., using P4-based switching rules) and/or a random or pseudo-random selection technique (e.g., using multiple PDFs).

In step 704, the packet processing pipeline may be configured using the command and control instructions, where the packet processing pipeline is implemented using the at least one programmable data plane processor. For example, command and control instructions may include data plane processing logic written in P4, network programming language (NPL) or another programming language. In this example, at least one programmable data plane processor (e.g., a P4 and/or NPL programmable network switch processor) may receive and utilize the data plane processing logic to configure a packet processing pipeline, e.g., a set of rules, operations, or instructions for processing packets, such as test packets that are transmitted to or via SUT 118 or other entities.

In step 706, at least one impairment may be applied, via the packet processing pipeline, to one or more test packets for testing a system under test (SUT).

In some embodiments, a first impairment device (e.g., impairment device(s) 114) may be cross-connected (e.g., via one or more physical ports) to an emulation device (e.g., EDCED 501) for providing an emulated data center switching fabric.

In some embodiments, one cross-connection link acts as a unidirectional link in the emulated data switching fabric or wherein a pair of cross-connection links act as a bidirectional link in the emulated data switching fabric.

In some embodiments, a SUT or devices thereof (e.g., SUT 118 and/or DUTs 502-504) may be connected directly to an emulation device (e.g., EDCED 501) or an impairment device (e.g., impairment device(s) 114).

In some embodiments, at least one impairment may be applied based on a per-flow selection technique utilizing switching rules in one or more switching tables or a random or pseudo-random selection technique utilizing one or more random number generators or PDFs. For example, command and control instructions (or data plane processing logic or instructions therein) may provide one or more programmable data plane processors selection algorithms, switching rules, random number generators, PDFs, and/or related data for implementing one or more selection techniques for impairing packets in or along a packet processing pipeline.

In some embodiments, a first impairment device may be connected to a second impairment device for causing at least one additional impairment or a spool of cable for adding delay or latency. For example, a second impairment device may be a loopback dongle or device, a network emulator device, or a sophisticated layer 1 impairment generator In some embodiments, the SUT may include a production switching fabric element, a network node, a server, a network interface card, an application server, or a group of servers.

In some embodiments, a first impairment device may include a test packet generator or a data center switching fabric emulator. For example, impairment device(s) 114 may include modules or software for performing functionality similar to or the same as TE 106 and/or EDCED 501.

In some embodiments, a first impairment device (e.g., impairment device(s) 114) may be incorporated within or integrated with a programmable data plane processor-based switching fabric emulation device (e.g., EDCED 501).

In some embodiments, a first impairment device may be an element or component of test system 102. For example, test system 102 may include or control impairment device(s) 114, a traffic controller module (e.g., TC 104), a test packet generator module (e.g., TE 106 and/or RE 108) and/or a switching fabric emulator module (e.g., EDCED 501).

In some embodiments, a SUT may include a production switching fabric element, a network node, a server, a network interface card, an application server, or a group of servers.

In some embodiments, a reporting module (e.g., testing apps 110 or an impairment sensor(s)/analyzer) associated with test system 102 may monitor, analyze, and report a performance impact of at least impairment on an emulated data center switching fabric (e.g., environment 200) or a SUT (e.g., SUT 118) connected to test system 102.

In some embodiments, at least one impairment (e.g., performed by impairment device(s) 114) may include a frame or packet drop, a frame or packet duplication, packet reordering, a packet burst, a delay increase, a jitter increase, a latency increase, a frame error, a header field scrambling, traffic shaping, bandwidth limiting, a policy based behavior causing impairment, a packet misdirection or misrouting, a link failure, a link flap, or a checksum or validation error.

It will be appreciated that process 700 is for illustrative purposes and that different and/or additional actions may be used. It will also be appreciated that various actions described herein may occur in a different order or sequence.

It should be noted that test system 102, impairment device(s) 114, and/or functionality described herein may constitute one or more special purpose computing devices. Further, test system 102, impairment device(s) 114, and/or functionality described herein can improve the technological field of testing networks and related nodes by providing techniques and mechanisms for impairing test packets in various test environments.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for programmable data plane processor based traffic impairment, the method comprising:
    at a first impairment device comprising at least one programmable data plane processor:
        receiving, via an application programming interface (API) and from a test controller, command and control instructions for configuring a packet processing pipeline for facilitating traffic impairments;
        configuring, using the command and control instructions, the packet processing pipeline implemented using the at least one programmable data plane processor; and
        applying, via the packet processing pipeline, at least one impairment to one or more test packets for testing a system under test (SUT), wherein the at least one programmable data plane processor applies the at least one impairment based on a per-flow selection technique utilizing switching rules in one or more switching tables and/or a random or pseudo-random selection technique utilizing one or more random number generators and/or probability density functions.

2. The method of claim 1 wherein the first impairment device is cross-connected, via one or more physical ports, to an emulation device for providing an emulated data center switching fabric.

3. The method of claim 2 wherein one cross-connection link acts as a unidirectional link in the emulated data switching fabric or wherein a pair of cross-connection links act as a bidirectional link in the emulated data switching fabric.

4. The method of claim 2 wherein the SUT is connected directly to the emulation device or the first impairment device.

5. The method of claim 1 wherein the command and control instructions includes data plane processing logic written in P4, network programming language (NPL), or other programming language and the at least one programmable data plane processor utilizes the data plane processing logic.

6. The method of claim 1 wherein the first impairment device is connected to a second impairment device for causing at least one additional impairment or a spool of cable for adding delay or latency.

7. The method of claim 1 wherein the SUT includes a production switching fabric element, a network node, a server, a network interface card, an application server, or a group of servers.

8. The method of claim 1 wherein the first impairment device includes a test packet generator or a data center switching fabric emulator.

9. The method of claim 1 wherein the at least one impairment includes a frame or packet drop, a frame or packet duplication, packet reordering, a packet burst, a delay increase, a jitter increase, a latency increase, a frame error, a header field scrambling, traffic shaping, bandwidth limiting, a policy based behavior causing impairment, a packet misdirection or misrouting, a link failure, a link flap, or a checksum or validation error.

10. A system for programmable data plane processor based traffic impairment, the system comprising:
at least one programmable data plane processor; and
a first impairment device comprising the at least one programmable data plane processor:
receiving, via an application programming interface (API) and from a test controller, command and control instructions for configuring a packet processing pipeline for facilitating traffic impairments;
configuring, using the command and control instructions, the packet processing pipeline implemented using the at least one programmable data plane processor; and
applying, via the packet processing pipeline, at least one impairment to one or more test packets for testing a system under test (SUT), wherein the at least one programmable data plane processor applies the at least one impairment based on a per-flow selection technique utilizing switching rules in one or more switching tables and/or a random or pseudo-random selection technique utilizing one or more random number generators and/or probability density functions.

11. The system of claim 10 wherein the first impairment device is cross-connected, via one or more physical ports, to an emulation device for providing an emulated data center switching fabric.

12. The system of claim 11 wherein one cross-connection link acts as a unidirectional link in the emulated data switching fabric or wherein a pair of cross-connection links act as a bidirectional link in the emulated data switching fabric.

13. The system of claim 11 wherein the SUT is connected directly to the emulation device or the impairment device.

14. The system of claim 10 wherein the first impairment device is connected to a second impairment device for causing at least one additional impairment or a spool of cable for adding delay or latency.

15. The system of claim 10 wherein the SUT includes a production switching fabric element, a network node, a server, a network interface card, an application server, or a group of servers.

16. The system of claim 10 wherein the first impairment device includes a test packet generator or a data center switching fabric emulator.

17. The system of claim 10 wherein the command and control instructions includes data plane processing logic written in P4, network programming language (NPL), or other programming language.

18. The system of claim 17 wherein the at least one programmable data plane processor utilizes the data plane processing logic.

19. The system of claim 10 wherein the at least one impairment includes a frame or packet drop, a frame or packet duplication, packet reordering, a packet burst, a delay increase, a jitter increase, a latency increase, a frame error, a header field scrambling, traffic shaping, bandwidth limiting, a policy based behavior causing impairment, a packet misdirection or misrouting, a link failure, a link flap, or a checksum or validation error.

20. A non-transitory computer readable medium having stored thereon executable instructions embodied in the non-transitory computer readable medium that when executed by at least one processor of a computer cause the computer to perform steps comprising:
at a first impairment device comprising at least one programmable data plane processor:
receiving, via an application programming interface (API) and from a test controller, command and control instructions for configuring a packet processing pipeline for facilitating traffic impairments;
configuring, using the command and control instructions, the packet processing pipeline implemented using the at least one programmable data plane processor; and
applying, via the packet processing pipeline, at least one impairment to one or more test packets for testing a system under test (SUT), wherein the at least one programmable data plane processor applies the at least one impairment based on a per-flow selection technique utilizing switching rules in one or more switching tables and/or a random or pseudo-random selection technique utilizing one or more random number generators and/or probability density functions.

* * * * *